United States Patent
Chen

(10) Patent No.: US 6,961,081 B2
(45) Date of Patent: Nov. 1, 2005

(54) POSITIONING AND INSPECTING SYSTEM AND METHOD USING SAME

(75) Inventor: Cheng Ming Chen, Tainan (TW)

(73) Assignee: Hannstar Display Corp., Taipei (TW)

( * ) Notice: Subject to any disclaimer, the term of this patent is extended or adjusted under 35 U.S.C. 154(b) by 454 days.

(21) Appl. No.: 10/170,455

(22) Filed: Jun. 14, 2002

(65) Prior Publication Data

US 2003/0112331 A1 Jun. 19, 2003

(30) Foreign Application Priority Data

Dec. 17, 2001 (TW) .......................... 90131286 A

(51) Int. Cl.⁷ .............................. H04N 7/12; H04N 7/18; H04N 9/47
(52) U.S. Cl. ....................................................... 348/92
(58) Field of Search ........................... 348/92, 94, 125, 348/42–96; 324/758, 752, 770; 345/87; H04N 7/12, 9/47

(56) References Cited

U.S. PATENT DOCUMENTS

| | | | | |
|---|---|---|---|---|
| 5,764,209 A | * | 6/1998 | Hawthorne et al. | 345/87 |
| 5,793,221 A | * | 8/1998 | Aoki | 324/770 |
| 6,043,667 A | * | 3/2000 | Cadwallader et al. | 327/758 |
| 6,515,494 B1 | * | 2/2003 | Low | 324/752 |

* cited by examiner

*Primary Examiner*—Tung Vo

(57) ABSTRACT

A system for inspecting signals of the circuits on a panel includes a moveable stage with a transparent work area for holding the panel to be tested; a probe for contacting the panel; a tester for receiving a signal via the probe; an image sensing device disposed in an opposite side to the probe with respect to the stage; and image display device coupled to the image sensing device. The image display device includes a screen having a cross mark. When the system is operating, the probe is aligned with the image sensing device such that the captured image of the probe is displayed on the center of the cross.

14 Claims, 4 Drawing Sheets

POSITIONING AND INSPECTING SYSTEM AND METHOD USING SAME

BACKGROUND OF THE INVENTION

1. Field of the Invention

This invention relates to a positioning and inspecting system and a method for using the system, and more particularly for accurately positioning and inspecting outer leads on a transparent liquid crystal panel.

2. Description of the Related Art

Conventional liquid crystal display devices as shown in FIG. 1 have been known. This liquid crystal display device 10 is mainly composed of a liquid crystal panel 100, a plurality of tape carrier packages (TCPs) 102, and common printed wiring boards 104. The liquid crystal panel 100 is mainly composed of an upper glass substrate 110, a lower glass substrate 112, and a liquid crystal layer (not shown) interposed therebetween.

Each of the tape carrier packages 102 has a liquid crystal driver IC chip 106 for driving the liquid crystal. Each tape carrier package 102 includes outer leads respectively connecting the output terminals (not shown) and input terminals (not shown) of the package to the IC chip 106. The liquid crystal driver IC chip 106 is connected with the liquid crystal panel 100 via the output terminals and connected with the common printed wiring boards 104 via the input terminals. A signal is transmitted and power is supplied to each of the liquid crystal driver IC chips 106 via wires disposed on the common printed wiring board 104.

However, when a liquid crystal display device can not display image normally, the possible defect might exist in the liquid crystal panel or the other part of the liquid crystal display device, like the common printed wiring boards and the liquid crystal driver IC chips. Defective common printed wiring boards or liquid crystal driver IC chips fail to properly deliver the input signals to the liquid crystal panel. By inspecting the output terminals of the tape carrier package connected to the abnormal displaying region of the liquid crystal panel respectively, we can find out the defective part. Typically, the output terminals of the tape carrier package are closely-spaced and each of them has a width of about several tens of micrometers. Therefore, it's quite difficult to inspect them manually. Accordingly, there exists a need in the art for a system of accurately positioning and inspecting those output terminals. Currently, there is no positioning and inspecting system designed for this kind of application. When a finished liquid crystal display device displays abnormally, the whole liquid crystal device will be discarded because there is no way to find out the defective part thereby reducing the throughput of the liquid crystal display devices and raising the cost of the manufacturing of the liquid crystal display devices.

SUMMARY OF THE INVENTION

It is an object of the present invention to provide a system and a method for accurately positioning and inspecting terminals on a transparent substrate.

It is another object of the present invention to provide a system and a method for accurately positioning and inspecting the outer leads of a transparent liquid crystal panel which are connected to the output terminals of a tape carrier package. When a liquid crystal display device displays abnormally, it can be inspected by the system and the method to make sure whether the liquid crystal panel is defected or the other parts, such as the tape carrier packages or the common printed wiring boards, which drive the liquid crystal panel are defected. And the defective liquid crystal display device can be repaired by displacing the defective part instead of discarding the whole device thereby significantly raising the throughput of the liquid crystal display devices and reducing the manufacturing cost.

To achieve the above listed and other objects, the present invention provides an positioning and inspecting system. The system comprises a stage for holding a transparent substrate with a plurality of terminals and a first moving device for moving the stage. The stage includes a transparent work area. A probe is disposed above the stage and movable in a vertical direction relative to the stage for contacting the terminals of the transparent substrate. A tester, such as an oscilloscope, for receiving a signal from the transparent substrate is coupled with the probe. An image sensing device, such as a CCD camera, is disposed in an opposite side to the probe with respect to the stage. An image display device is coupled to the image sensing device for displaying an image picked up by the image sensing device. A second moving device is provided for moving the image sensing device.

The device for moving the stage has a macro-scale moving mechanism for moving the stage on a macro-scale and has a micro-scale moving mechanism for moving the stage on a micro-scale.

The image display device includes a screen having a cross mark. When the system is operating, the probe is aligned with the image sensing device such that the captured image of the probe is displayed on the center of the cross.

In order to acquire a clear image of the probe or the terminals for accurately positioning, the image sensing device may include an auto-focusing mechanism and/or focusing device having a mechanism for moving the image sensing device in the vertical direction relative to the stage.

The present invention further provides a method of using the above-mentioned system to accurately position and inspect the terminals on the transparent substrate. The method comprises steps as follows. First, the image sensing device is aligned with the probe in a vertical direction relative to the stage. Next, the transparent substrate is disposed on the stage in a manner that one terminal of the transparent substrate is disposed above the transparent work area of the stage. An input signal from a signal generator is transmitted into the transparent substrate. A focusing step is conducted such that the picked up images of the terminals of the transparent substrate are shown clearly on the screen of the image display device. The stage is moved such that the picked up image of one terminal is located on the center of the cross mark of the screen. Then, the probe is moved to contact the terminal. Finally, an output signal is received from the terminal by the tester.

The system and method described above can be used to inspect the outer leads of the liquid crystal panel which are connected to the tape carrier packages thereby finding out the defective part in the liquid crystal display device.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENTS

Figure 2:
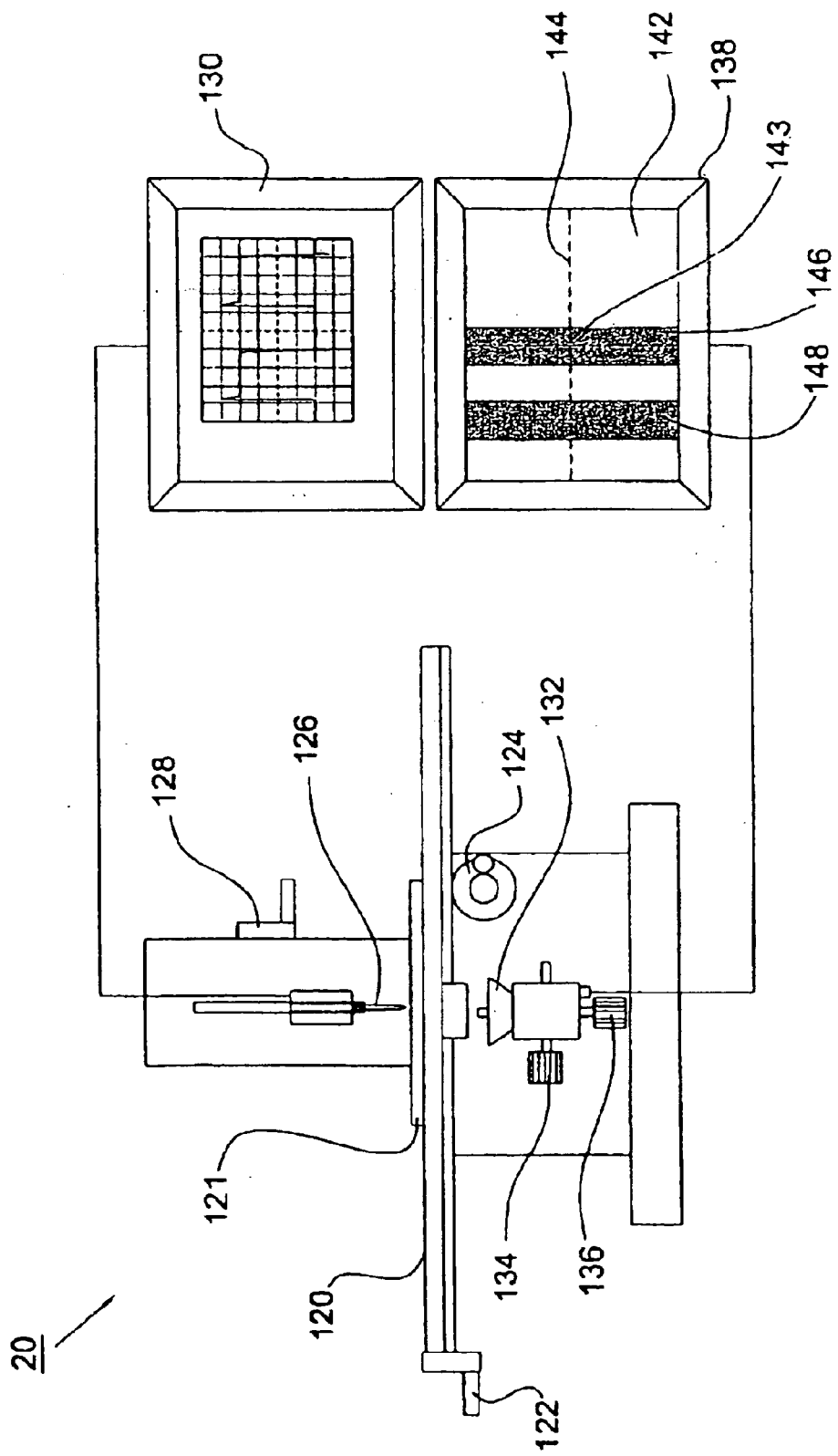
FIG. 2 is a schematic side view of a positioning and inspecting system according to a preferred embodiment of the present invention.

The present invention provides a system for accurately positioning and inspecting terminals on a transparent substrate. As shown in FIG. 2, the system comprises a stage 120 for holding the transparent substrate 121, moving device 122 and moving device 124 for moving the stage in two perpendicular directions on the plane parallel to the stage respectively. The stage 120 includes at least one transparent work area (not shown). Preferably, the moving device 122 and 124 respectively has a macro-scale moving mechanism for moving the stage on a macro-scale and has a micro-scale moving mechanism for moving the stage on a micro-scale.

A probe 126 is disposed above the stage 120 for contacting the terminals on the transparent substrate 121. The probe 126 is moved in a vertical direction relative to the stage 120 by elevator device 128, such that the probe 126 can contact or move away from the transparent substrate 121. A tester 130, such as an oscilloscope, is coupled to the probe for receiving a signal from the transparent substrate 121.

An image sensing device 132, such as a CCD camera, is disposed in an opposite side to the probe 126 with respect to the stage 120. There is moving device 134 for moving the image sensing device 132. The image sensing device 132 preferably includes an auto-focusing mechanism and/or focusing device 136 which has a mechanism for moving the image sensing device 132 in the vertical direction. And there is image display device 138 coupled with the image sensing device 132 for displaying an image picked up by the image sensing device 132. The image display device 138 includes a screen 142 having a cross mark 144. When the system is operating, the probe 126 is aligned with the image sensing device 132 such that the captured image of the probe 126 is displayed on an alignment mark 143, the center of the cross mark 144.

Figure 1:
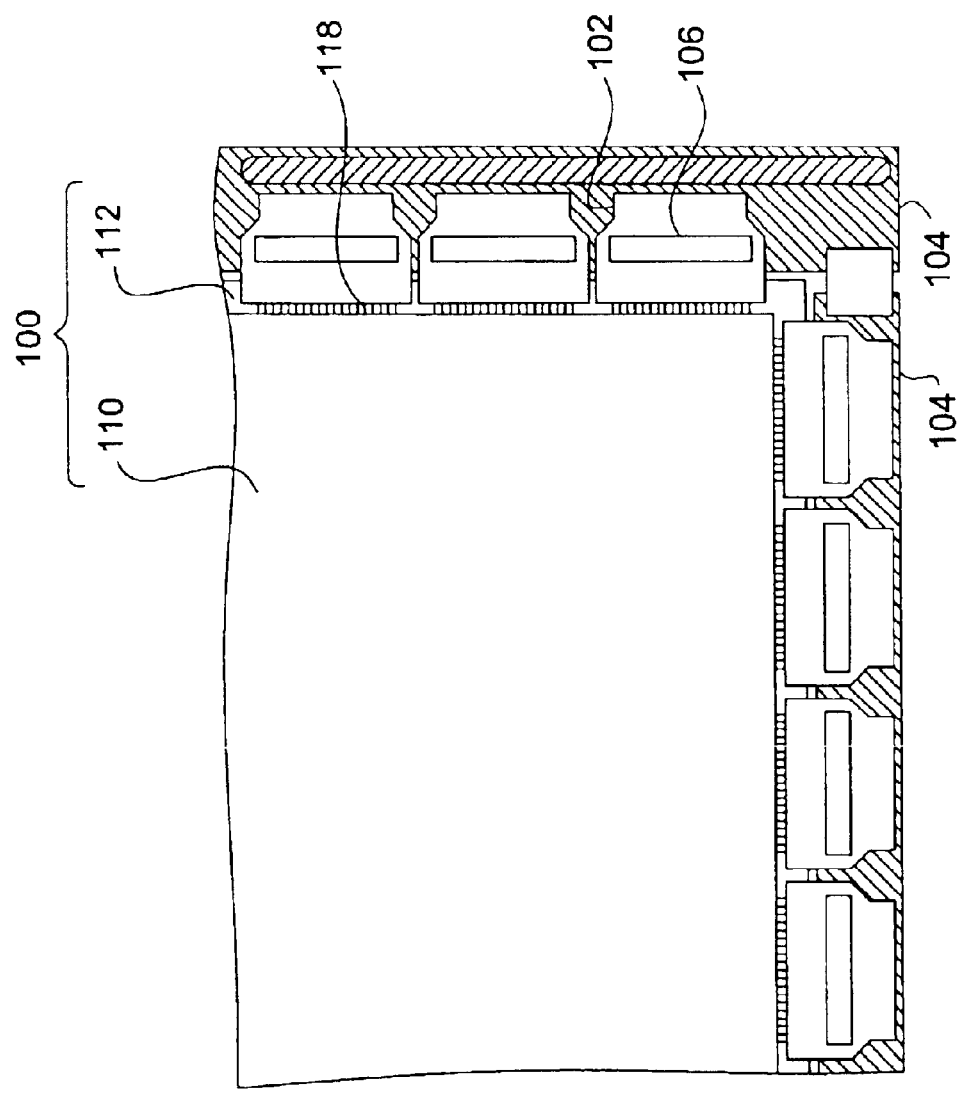
FIG. 1 is a plan view of a conventional liquid crystal display device.

As shown in FIG. 1, a conventional liquid crystal display device 10 is mainly composed of a liquid crystal panel 100, a plurality of tape carrier packages (TCPs) 102, and common printed wiring boards 104. The liquid crystal panel 100 is mainly composed of an upper glass substrate 110, a lower glass substrate 112, and a liquid crystal layer (not shown) interposed therebetween.

Figure 3:
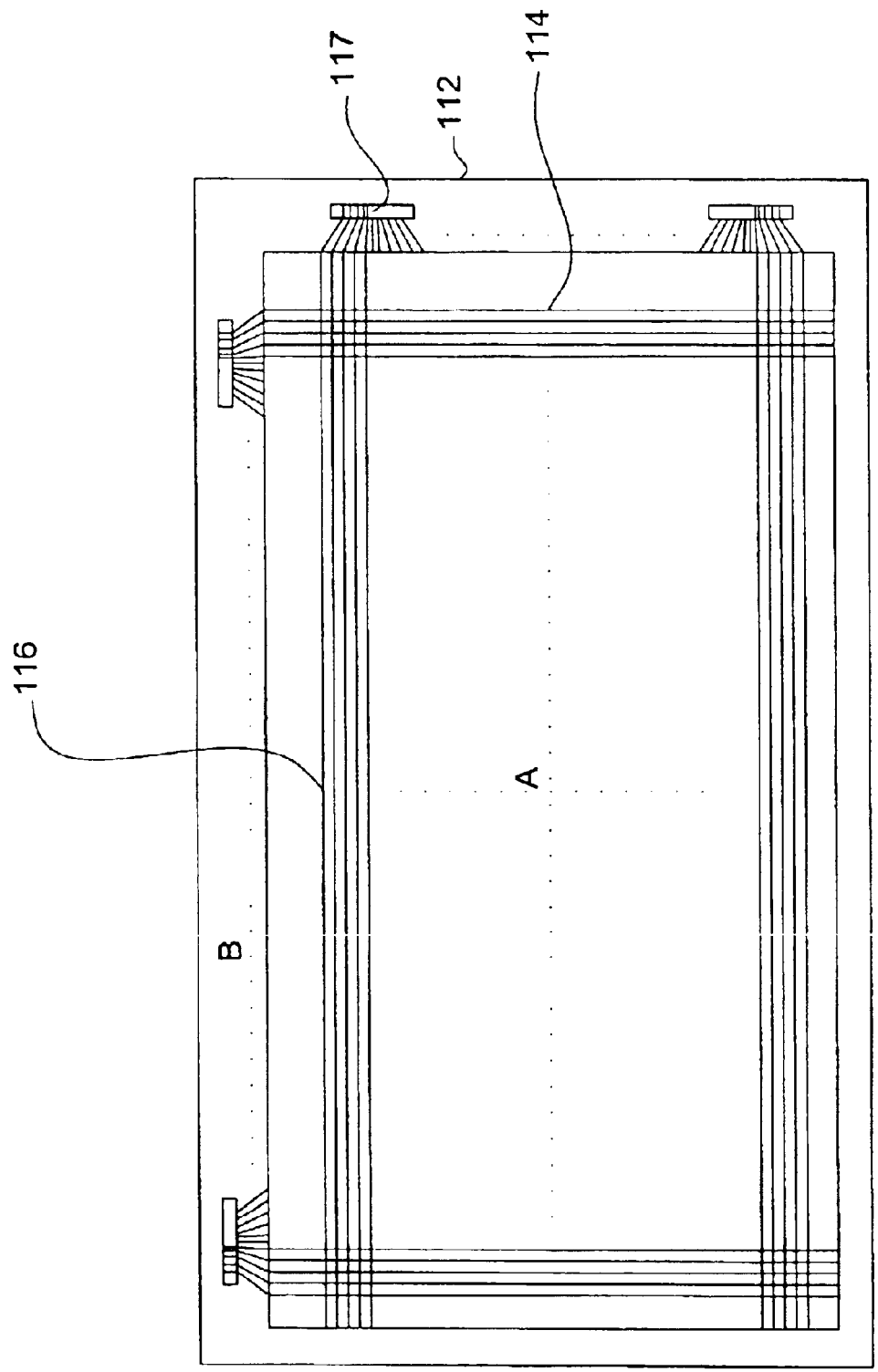
FIG. 3 is a plan view of a liquid crystal panel of a liquid crystal display device to be tested.
Figure 4:
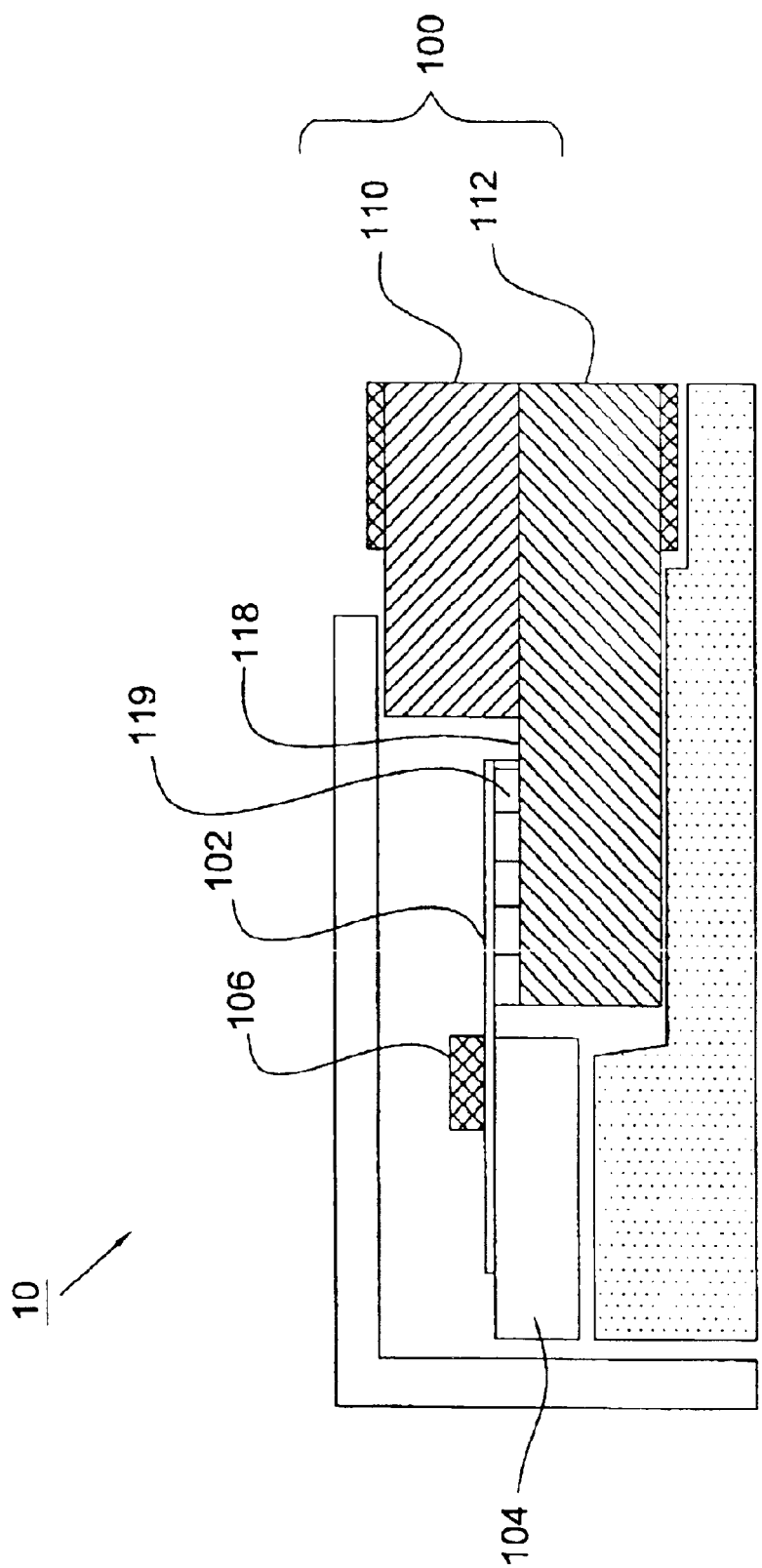
FIG. 4 is a cross-sectional view of a liquid crystal display device to be tested.

As shown in FIG. 3, the liquid crystal panel comprises a lower glass substrate 112, on which a plurality of signal lines 114 and a plurality of scanning lines 116 are arranged in a matrix and pixel electrodes (not shown) are positioned via thin film transistors (not shown, hereinafter referred to as TFT), functioning as switching elements, in the neighborhood of each of the cross sections between the signal lines and the scanning lines. The pixel electrodes and the thin film transistors are formed in an active area "A". The signal lines 112 and the scanning lines 114 typically extend out of the active area to form closely spaced outer leads each with a width of several tens of micrometers. The outer leads form a plurality of pads 117 in an out-lead bonding (OLB) pad area B near the periphery of the active area. The output terminals of each tape carrier package 102 overlap corresponding outer leads in the pads 117. As shown in FIG. 4, the output terminals of the tape carrier package 102 is electrically connected to the outer leads of the liquid crystal panel by a anisotropic conductive film 119. The signals from the common wiring board 104 and the tape carrier package 102 are transmitted into the liquid crystal panel 100 through the outer leads of the lower glass substrate 112 each of the outer leads of the lower glass substrate 112 has a portion not covered by the tape carrier package, hereinafter referred to as uncovered outer leads portion 118 (see FIG. 1 and FIG. 4). The driving signals transmitted from the output terminals of the tape carrier package 102 can be received by inspecting the uncovered outer lead portion 118.

The present invention further provides a method of using the above-mentioned system 20 to inspect the uncovered outer leads portion 118 on the lower glass substrate 112 of the liquid crystal panel 100. The method comprises steps as follows. First, by utilizing the moving device 134, the image sensing device 132 is aligned with the probe in a vertical direction relative to the stage 126 in a manner that the captured image of the probe 126 is shown on the center of the cross mark 144 on the screen 142 of the image display device 138. The probe 126 is disposed away from the surface of the stage 120.

Next, the transparent substrate 121 (or the liquid crystal display device 10, not shown in FIG. 2) is disposed on the stage 120. The terminals of the transparent substrate 121 (or the uncovered outer lead portions 118 of the liquid crystal display device 10) are disposed above the transparent work area of the stage such that the image sensing device 132 can pick up an image of the terminals (or the uncovered outer lead portions) through the transparent work area of the stage.

Then, the transparent substrate 121 (or the liquid crystal display device 10) is coupled to a signal generator (not shown). The signal generator supplies an input signal to drive the transparent substrate 121 (or the liquid crystal display device 10).

Thereafter, a focusing step is conducted by using the focusing device 136 or by using the auto-focusing mechanism of the image sensing device 132 in a manner that the images of the terminals or the uncovered outer lead portions are shown clearly on the screen 142 of the image display device 138. As shown in FIG. 2, it shows the uncovered portion of a first outer lead 146 and a second outer lead 148 on the screen 142 of the liquid crystal display device 138.

Referring to FIG. 2, the stage 120 is moved by controlling the moving device 122 and the moving device 124 such that the image of the uncovered portion of the first outer lead 146 is displayed on the center of the cross mark 144 of the screen 142.

The probe is moved in the vertical direction to contact the terminal or the uncovered portion of the outer lead by controlling the elevator device 128. Since the probe 126 and the uncovered portion of the first outer lead 146 are both located at the position corresponding to the center of the cross mark on the screen, the probe 126 can contact the uncovered portion of the first outer lead 146 accurately. Finally, the tester 130 receives an output signal from the first outer lead 146 via the probe 126.

Furthermore, the present invention provides a method to inspect a plurality of terminals for typical inspecting of the outer leads of the liquid crystal display device. That is, after inspecting the first outer lead 146 as mentioned above, the probe 126 is moved away from the uncovered portion of the first outer lead 146 in the vertical direction. Then, the stage 120 is moved such that the image of the uncovered portion of the second outer lead 148 is displayed on the center of the cross mark 144 of the screen 142. The probe 126 is moved in the vertical direction to contact the uncovered portion of the second outer lead 148. Finally, the tester 130 receives an output signal from the second outer lead 148 via the probe 126. The following outer leads can be inspected in the same way described above.

The inspecting system and method provided by the present invention is suitable for accurately positioning and inspecting closely-spaced terminals of a liquid crystal panel. When a complete liquid crystal display device display abnormally, the output signals of the tape carrier packages can be checked out by inspecting the corresponding outer leads of the liquid crystal panel as described above. Accordingly, the question about whether the liquid crystal panel or the other parts (such as the common wiring board or the tape carrier packages) are defective can be judged by whether the output signal of the tape carrier package matches the input signal form the signal generator or not. Through the inspection described above, the defective part of the liquid crystal display device can be repaired or displaced, and the good part can be fully utilized thereby lowering the manufacturing cost.

Although the invention has been explained in relation to its preferred embodiment, it is to be understood that many other possible modifications and variations can be made without departing from the spirit and scope of the invention as hereinafter claimed.

What is claimed is:

1. A positioning and inspecting system, comprising:
   a stage for holding a transparent substrate with at least one terminal, the stage including a transparent work area;
   a first moving device for moving the stage;
   a probe disposed above the stage and movable in a vertical direction relative to the stage for contacting said at least one terminal of the transparent substrate;
   a tester for receiving a signal from said at least one terminal of the transparent substrate via the probe;
   an image sensing device disposed below the stage;
   an image display device for displaying an image picked up by the image sensing device; and
   a second moving device for moving the image sensing device;
   wherein
   the image display device includes a screen having an alignment mark; and
   in operation, the probe is aligned with the image sensing device such that the picked up image of the probe is displayed on the alignment mark.

2. The system as claimed in claim 1, wherein the image sensing device comprises an auto-focusing mechanism.

3. The system as claimed in claim 1, further comprising a focusing device having a mechanism for moving the image sensing device in a vertical direction relative to the stage.

4. The system as claimed in claim 1, wherein the first moving device has a macro-scale moving mechanism for moving the stage on a macro-scale and have a micro-scale moving mechanism for moving the stage on a micro-scale.

5. The system as claimed in claim 1, wherein the screen has a cross mark, and the alignment mark is the center of the cross mark.

6. The system as claimed in claim 1, wherein the tester is an oscilloscope.

7. The system as claimed in claim 1, wherein the image sensing device is a CCD camera.

8. The system as claimed in claim 1, wherein the system is applied to inspect a liquid crystal display device, the liquid crystal device comprises:
   a liquid crystal panel including a pair of glass substrates and connecting wiring formed on at least one of the glass substrates, wherein the connecting wiring includes a plurality of outer leads extending on a periphery of the liquid crystal panel; and
   at least one tape carrier packages mounted on the periphery of the liquid crystal panel in such a manner that at least a portion of each outer lead is not covered by the tape carrier package.

9. A positioning and inspecting method, comprising the steps of:
   (a) providing a positioning and inspecting system comprising:
   a stage having a transparent work area;
   a probe disposed above the stage and movable in a vertical direction relative to the stage;
   a tester;
   an image sensing device disposed below the stage; and
   an image display device for displaying an image picked up by the image sensing device, wherein the image display device includes a screen with a cross mark;
   (b) aligning the image sensing device with the probe such that the picked up image of the probe is displayed on the center of the cross mark of the screen;
   (c) disposing a transparent substrate on the stage in such a manner that at least one terminal of the transparent substrate is disposed above the transparent work area of the stage;
   (d) providing an input signal to the transparent substrate;
   (e) conducting a focusing step such that the picked up image of at least said terminal of the transparent substrate is shown clearly on the screen of the image display device;
   (f) moving the stage such that the picked up image of said terminal is located on the center of the cross mark of the screen;
   (g) moving the probe to contact said terminal; and
   (h) receiving an output signal from said terminal by the tester via the probe.

10. The method as claimed in claim 9, wherein the tester is an oscilloscope.

11. The method as claimed in claim 9, wherein the image sensing device is a CCD camera.

12. A method of positioning and inspecting outer leads on a liquid crystal display device, the method comprising the steps of:
   (a) obtaining the liquid crystal display device, the liquid crystal display device comprising:
   a liquid crystal panel including a pair of glass substrates and connecting wiring formed on at least one of the glass substrates, wherein the connecting wiring includes a plurality of outer leads extending on a periphery of the liquid crystal panel; and
   at least one tape carrier packages mounted on the periphery of the liquid crystal panel in such a manner that at least a portion of each outer lead is not covered by the tape carrier package;
   (b) providing a positioning and inspecting system comprising:
   a stage having a transparent work area;
   a probe disposed above the stage and movable in a vertical direction relative to the stage;
   a tester;
   an image sensing device disposed below the stage; and
   an image display device for displaying an image picked up by the image sensing device, wherein the image display device includes a screen with a cross mark;

(c) aligning the image sensing device with the probe such that the picked up image of the probe is displayed on the center of the cross mark of the screen;

(d) disposing the liquid crystal display device having the outer leads on the stage;

(e) providing an input signal to the liquid crystal display device;

(f) conducting a focusing step in such a manner that the picked up image of the uncovered portion of at least one of the outer leads of the liquid crystal display device is shown clearly on the screen of the image display device;

(g) moving the stage such that the picked up image of the uncovered portion of said outer lead is located on the center of the cross mark of the screen;

(h) moving the probe to contact the uncovered portion of said outer lead of the liquid crystal display device; and (i) receiving an output signal from the uncovered portion of said outer lead by the tester via the probe.

13. The method as claimed in claim 12, wherein the tester is an oscilloscope.

14. The system as claimed in claim 12, wherein the image sensing device is a CCD camera.

* * * * *